United States Patent [19]

Kersemakers et al.

[11] Patent Number: 4,978,493
[45] Date of Patent: Dec. 18, 1990

[54] PROCESS FOR INJECTION MOULDING MULTILAYERED ARTICLES

[75] Inventors: Jozef J. F. M. Kersemakers, Sittard; Henricus E. H. Meijer, Born; Gerardus Martens, Stein, all of Netherlands

[73] Assignee: Stamicarbon B.V., Geleen, Netherlands

[21] Appl. No.: 354,415

[22] Filed: May 19, 1989

Related U.S. Application Data

[63] Continuation-in-part of Ser. No. 75,976, Jul. 21, 1987, abandoned.

[30] Foreign Application Priority Data

Jul. 21, 1986 [NL] Netherlands ......................... 8601883

[51] Int. Cl.$^5$ ....................... B29C 45/02; B29C 45/16
[52] U.S. Cl. ................................. 264/255; 264/328.8; 425/131.1; 425/542
[58] Field of Search ..................... 264/328.8, 245, 255; 425/131.1, 133.1, 567, 568, 542

[56] References Cited

U.S. PATENT DOCUMENTS

| | | | |
|---|---|---|---|
| 3,716,612 | 2/1973 | Schrenk | 425/131.1 |
| 3,864,069 | 2/1975 | Takiura | 425/131.1 |
| 3,920,366 | 11/1975 | Randall | 425/131.1 |
| 4,029,841 | 6/1977 | Schmidt | 264/245 |
| 4,511,528 | 4/1985 | Kudert | 264/328.8 |
| 4,701,292 | 10/1987 | Valyi | 264/328.8 |
| 4,715,802 | 12/1987 | Arai | 264/328.8 |
| 4,749,536 | 6/1988 | Farrell | 264/328.8 |
| 4,772,195 | 9/1988 | Touchet | 425/131.1 |

FOREIGN PATENT DOCUMENTS

| 8702932 | 5/1987 | European Pat. Off. | ......... 425/131.1 |
|---|---|---|---|
| 8705258 | 9/1987 | European Pat. Off. | ......... 425/131.1 |

Primary Examiner—Jay H. Woo
Assistant Examiner—Jeremiah F. Durkin, II
Attorney, Agent, or Firm—Cushman, Darby & Cushman

[57] ABSTRACT

The invention relates to a process for injection molding articles having a number of layers of different plastic materials that are sequentially and/or coaxially injected, in plasticized form, into a mould. Prior to injection, the different plastic materials are brought into a hollow chamber in a preselected order and amounts, with the aid of separate injection units or by means of a distributor, which is made of elementary modules, each of which is capable of creating a certain combination and configuration of plastic materials in the chamber. The contents of the chamber are then injected into the mould.

4 Claims, 4 Drawing Sheets

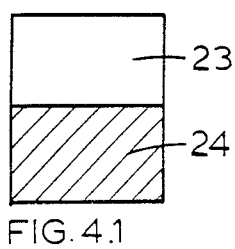
FIG. 4.1
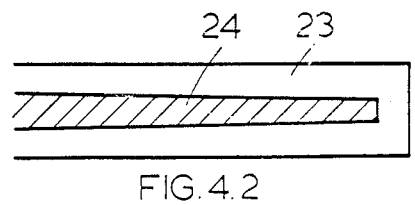
FIG. 4.2
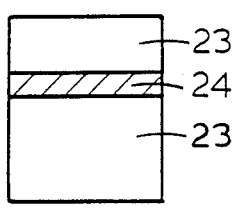
FIG. 5.1
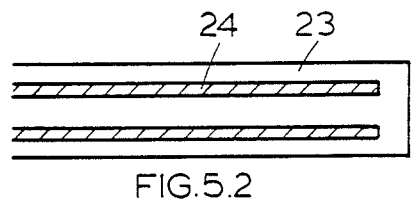
FIG. 5.2
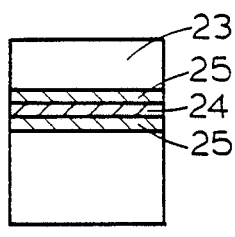
FIG. 6.1
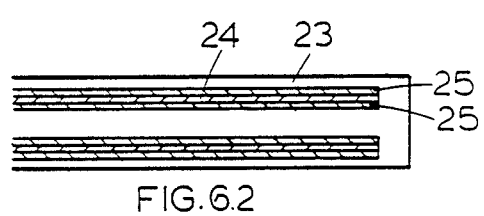
FIG. 6.2
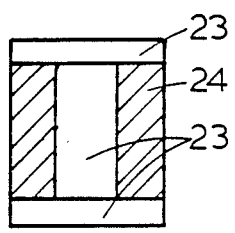
FIG. 7.1
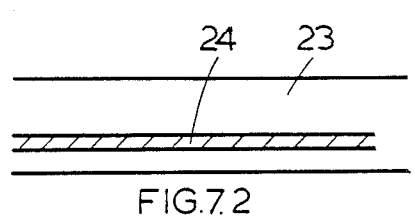
FIG. 7.2

PROCESS FOR INJECTION MOULDING MULTILAYERED ARTICLES

This application is a continuation-in-part of U.S. Ser. No. 075,976, filed July 21, 1987 now abandoned.

BACKGROUND OF THE INVENTION

This invention relates to a process and a device for injection moulding articles comprising a number of layers of different plastic materials, in which the different plastic materials are sequentially and/or coaxially injected (from concentric chambers along a common axis of introduction) in plasticised form, into a mould.

In particular, the invention relates to injection moulding multilayered thin-walled objects with a wall thickness of 0.5–3.0 mm.

An example of such a process is described in British Pat. No. 1,475,898, wherein first, second and third materials are sequentially injected into a mould cavity to provide an article having an external layer, an intermediate layer and a core. After a first material has been injected into the mould cavity it will flow into the cavity until it fills the mould. Before the first material has solidified, a second material is injected into the mould which will penetrate the first material, forcing it back towards the walls of the mould in such a manner that the first material forms the external layer and the second material forms an intermediate layer. The third material is then injected into the mould and will penetrate the second material to form the core.

Since the materials are injected into the mould from a single discharge injection unit, the flow of materials from the three concentric chambers to the plasticising units and the channels to the discharge unit are controlled by valves.

However, when an injection moulding process is used for the production of thin-walled objects, the mould must be filled within a very short time interval, i.e. about one second. Since the walls of the mould are relatively cooler than the plasticising and discharge injection units, the thin, plastic layers of material will begin to solidify and if the material solidifies or hardens too quickly, the materials will not be distributed uniformly in the mould.

Further, since valves are used to control the flow of the materials, the introduction of those materials into the mould imposes a further limitation on the reduction of the injection time.

Other problems associated with using such a device is that the plasticising/injection units and bodies cannot be moved rapidly, in order to reduce the time intervals between injections, and this results in a non-uniform distribution of the materials. In addition, such devices are difficult to manufacture when three or more different materials are to be injection moulded. Moreover, this problem occurs if a multi-step velocity profile is desired.

The present invention provides a process and a device which overcomes the above-mentioned problems.

Therefore, an object of the invention is to inject the different materials into the mould in as short a time interval as possible.

The process according to the present invention is characterized in that the different plastic materials are brought into a cavity or hollow chamber/injection unit through a distributor in a preselected order and amounts prior to injection of the materials from the cavity or hollow chamber/injection unit into the mould.

By application of this process, a significant reduction in the amount of time it takes to fill the mould is achieved, since the mould is filled from a single injection unit.

Further, the period of time which is available for filling the cavity including the cooling time (per cycle) in the process takes place over a shorter period of time than in the processes described in the prior art. Therefore, a number of multilayered compositions can be produced.

The shorter period of time required to fill the mould is also advantageous from an economic standpoint.

An example of this process is described in British Pat. No. 1,420,948 and U.S. Pat. No. 4,029,841, wherein the skin and core materials are positioned in a heating zone, heated and forced into the mould to form articles made of different polymer compositions.

However, British Pat. No. 1,420,948 discloses the use of taps to control the flow of the skin and core materials into the core material barrel and to permit injection of those materials into the mould.

U.S. Pat. No. 4,029,841 discloses that any injection moulding apparatus can be employed which permits a thermoplastic material to be injected into a mould cavity subject to the proviso that the equipment employed force the thermoplastic melt into the mould cavity in response to a force transmitted to the polymer melt by a nonrotating plunger contained within the barrel of an injection moulding machine as opposed and in contradistinction to the force transmitted to a polymer melt as a result of the rotation and thrust of the screw in the barrel of an injection moulding apparatus. However, a conventional injection moulding apparatus would also involve the use of a valve or tap.

Therefore, each of these methods imposes a further limitation on the reduction of the injection time.

In the process according to the present invention, the plastic materials are injected through a distributor comprising a plurality of disc shaped sections into a cavity or hollow chamber/injection unit after the plasticising phase and subsequently injecting the plastic materials in the cavity or hollow chamber/injection unit through the distributor and into the mould and, thus, form uniformly arranged layers within the mould without affecting the composition of those layers.

An advantage in using such a process is that relatively simple and inexpensive equipment can be used to fill the mould, i.e., a number of plasticising units and one injection unit.

The plastic materials are brought into the cavity or hollow chamber/injection unit in a preselected order and amounts by using a distributor. The cavity or hollow chamber/injection unit serves as a cavity or hollow chamber to receive and briefly hold and store the plastic materials and also as a means to inject those materials into the mould.

The distributor comprises a number of elementary modules, each capable of creating a particular combination and configuration of plastic materials in the cavity or hollow chamber/injection unit.

By this manner an article comprising many different layers can be made by simply moving the modules.

The elementary modules comprise a number of disc shaped elements provided with radially extending borings or holes. The disc shaped elements are arranged in a stack which can be moved in an axial direction with the aid of moving devices.

Each disc shaped element can be moved both axially as well as rotating around an axis to align the openings (borings) with the plasticising units in order to fill each disc with a particular plastic material and to discharge the material through an outlet to fill the cavity or hollow chamber/injection unit. This procedure is continued by moving the discs in the axial direction to add other plastic materials from a plasticising unit through the distributor into the cavity or hollow chamber/injection unit. After the cavity or hollow chamber/injection unit is filled with a preselected combination of plastic materials, the contents are injected into the mould through the distributor using a disc that connects the cavity or hollow chamber/injection unit to the feed channel of the mould.

The plasticising units and/or injection units can be connected to the cavity or hollow chamber/injection unit through the borings. Further, the borings may also be located concentrically along part of their length to enable the coaxial introduction of a number of materials.

The present invention also relates to a device for injection molding articles comprising a number of layers of different plastic materials, wherein the device comprises a mould, a distributor, a number of plasticising units and at least one injection unit.

The device according to the present invention comprises a cavity or hollow chamber/injection unit, which is connected to the plasticising units through a distributor. The cavity or hollow chamber/injection unit is further provided with an injection unit for injecting the contents of the cavity or hollow chamber through the distributor into the mould.

By using a cavity or hollow chamber provided with an injection unit, it is possible to fill the mould over a shorter period of time.

The device of the present invention further comprises a distributor containing a number of elementary modules, with which each plasticising unit can be connected, either separately or in combination with another unit to the cavity or hollow chamber/injection unit.

In this manner a device can be made which is suitable for manufacturing an article with the following properties, such as a particular thickness of each layer, the number of layers, the position of a particular layer in the article and so forth by simply positioning or moving the modules in the distributor.

The distributor comprises a number of disc-shaped elements, provided with radially extending borings, which elements are arranged to form an elongated body, which can be moved by means of moving devices and can be fixed in a discrete position. The outer circumference of each disc-shaped element may be shaped like a regular polygon (triangle, quadrangle, etc.) or preferably a circle.

The process and device according to the invention are further illustrated in the drawings, described below.

BRIEF DESCRIPTION OF THE DRAWINGS

FIGS. 4.1 and 4.2 show the arrangement of the layers in the hollow chamber and in the mould, for an article comprising 3 layers.

FIGS. 5.1 and 5.2 show the arrangement of the layers in the hollow chamber and in the mould, for an article comprising 5 layers.

FIGS. 6.1 and 6.2 show the arrangement of the layers in the hollow chamber and in the mould, for an article comprising 9 layers.

FIGS. 7.1 and 7.2 show the arrangement of the layers in the hollow chamber and in the mould, for an article comprising 3 layers with a core layer (on the injection side).

FIGS. 8.1 and 8.2 show the arrangement of the layers in the hollow chamber and in the mould, for an article comprising 3 layers with a core layer (on the sealing side).

FIGS. 9.1 and 9.2 show the arrangement of the layers in the hollow chamber and in the mould, for an article comprising 3 layers with a core layer (on the sealing side), with an improved layer thickness distribution.

FIGS. 10.1 and 10.2 show the arrangement of the layers in the hollow chamber and in the mould, for an article comprising 5 layers with a core layer.

FIGS. 11.1 through 11.6 shows the discs used in the distributor.

DETAILED DESCRIPTION OF THE DRAWINGS

Figure 1:
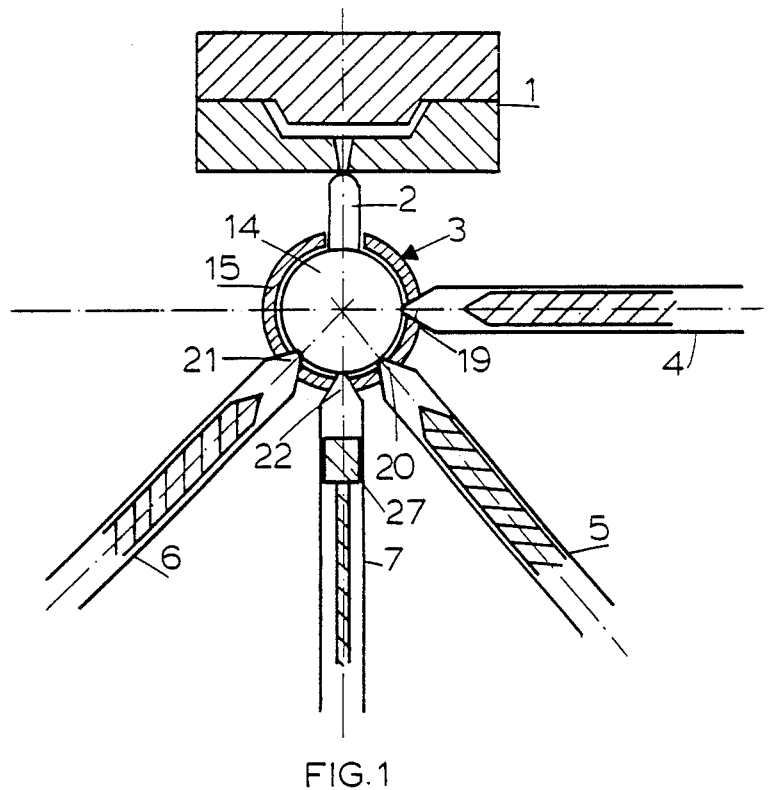
FIG. 1 is a schematic representation (top view) of an injection moulding device comprising a mould, a feed channel, a distributor and three plasticising units and an injection unit.

FIG. 1 shows a schematic representation of an injection moulding device comprising a mould 1, a feed channel 2, a distributor 3, a first plasticising unit 4, a second plasticising unit 6 and a hollow chamber/injection unit 7. A plunger 27 is used to inject the plastic materials into the mould and to prevent the build-up of residual material in the cavity or hollow chamber/injection unit 7. Alternatively, a screw or plasticising unit can be used.

The cavity or hollow chamber/injection unit, is connected to the plasticising units 4, 5, and 6 through a distributor 3.

Figure 2:
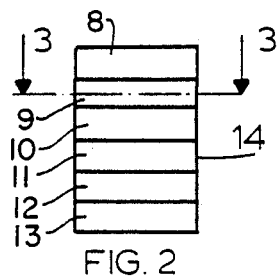
FIG. 2, is a side view of the distributor elements, comprising the disc shaped elements of the distributor.
Figure 3:
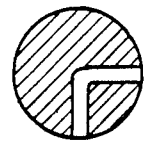
FIG. 3 is a cross-sectional view along line 3—3 in FIG. 2.

The distributor 3, comprises a housing 15, an elongated body 14 (FIG. 2) further comprising of a number of discs 8 to 13 (FIGS. 2 and 11.1 to 11.6), which can be moved in an axial direction by means of moving devices (not shown). Each disc is provided with one or more borings which are in open communication with plasticising units and cavity or hollow chamber/injection unit. In FIG. 11.3 for example, a disc 10 with three borings 17, 18 and 26, which are concentric along part of their length are shown. The outlets 19, 20, 21 and 22 of plasticising units 4, 5 and 6 and hollow chamber/injection unit 7, respectively, all lie approximately in the same transverse plane of distributor 3.

The plastic materials are brought into the cavity or hollow chamber/injection unit 7 from the plasticising units 4–6 through one of discs 8–13 in distributor 3 in a preselected order and amounts. The cavity or hollow chamber/injection unit 7 serves as a cavity or hollow chamber for receiving the plastic materials and also as a means to inject those materials into the mould.

The distributor 3 comprises a number of elementary modules, each capable of creating a particular combination and configuration of plastic materials in the cavity or hollow chamber/injection unit.

The elementary modules comprise a number of disc shaped elements provided with radially extending borings or holes. The disc shaped elements 8 to 13 (FIGS. 2 and 11.1 to 11.6) are arranged in a stack in a housing 15 which can be moved in an axial direction with the aid of moving devices.

Each disc shaped element can be moved to align the openings (borings) with the plasticising units 4, 5 and 6 in order to fill each disc with a particular plastic material and to discharge the material through an outlet to fill the cavity or hollow chamber/injection unit 7. This procedure is continued by moving the discs in the axial direction to add other plastic materials from a plasticising unit 4, 5 or 6 through the distributor 3 into the cavity or hollow chamber/injection unit 7. After the cavity or hollow chamber/injection unit 7 is filled with a preselected combination of plastic materials, the contents are injected into the mould 1 through the distributor 3 using a disc 13 that connects the cavity or hollow chamber/injection unit 7 to the feed channel 2 of the mould 1.

FIGS. 4 to 10 show a number of possible combinations of materials that may be used and their arrangement in the chamber. For example, layer 23 comprising polypropylene, commercially available under the trade name STAMP56M10, layer 24 comprising ethylene vinylalcohol (EVAL), commercially available under the trade-name "EVAL EPG", and layer 25 comprising a polyolefin resin material that improves the adhesion between polypropylene and eval, which is available under the trade name "ADMER QF 540".

FIGS. 4.1, 5.1, 6.1, 7.1, 8.1, 9.1 and 10.1 are longitudinal sections of the contents of the cavity or hollow chamber/injection unit. With the aid of the discs positioned especially for that purpose in the plane of outlets 19 to 21, the various plastic materials are sequentially introduced into the hollow chamber/injection unit 7 by the plasticising units 4, 5 and 6. With the aid of disc 13 the contents of the hollow chamber are finally injected into mould 1 by feed channel 2.

Discs 8 to 13 are dimensioned such that the volume of material to be injection molded is small when compared to the volume of the mould.

In another embodiment of the device of the present invention comprises a hollow chamber which is positioned between the feed channel and the distributor (not illustrated) so that the volume of the residual material remaining after injection from the hollow chamber into the mould is minimal.

In the claims:

1. An injection molding process for producing a multilayered article comprising the steps of:
    (a) sequentially or coaxially filling a single hollow chamber with a combination of mouldable material from a plurality of plasticising units through a distributor comprising a number of movable disc shaped elements provided with radially extending borings, and
    (b) subsequently injecting said combination of mouldable material from said chamber through a boring in said distributor and into a mold.

2. A process according to claim 1, wherein said disc shaped elements in step (a) are positioned by means of moving devices to align said borings with said plasticising units to fill each disc with said mouldable material and to discharge said mouldable material into said injection unit.

3. A process according to claim 1, wherein said combination of mouldable material is injected into said mould through a disc shaped element that connects said injection unit to said feed channel.

4. A process for injection moulding an object consisting of a number of layers of different materials, comprising the steps of:
    (a) sequentially or coaxially injecting a plasticized material from separate injection units into a distributor, wherein said distributor is capable of creating a certain combination and configuration of materials and
    (b) axially injecting the combination and configuration of materials through a hollow chamber which is positioned between a feed channel and said distributor in a desired order and amounts into a mould.

* * * * *